UNITED STATES PATENT OFFICE.

OTTO E. RUHOFF, OF MADISON, WISCONSIN, ASSIGNOR TO FRENCH BATTERY & CARBON CO., OF MADISON, WISCONSIN, A CORPORATION OF WISCONSIN.

METHOD OF MAKING PRIMARY BATTERIES.

1,331,213. Specification of Letters Patent. Patented Feb. 17, 1920.

No Drawing. Original application filed June 9, 1917, Serial No. 173,660. Divided and this application filed November 9, 1918. Serial No. 261,776.

*To all whom it may concern:*

Be it known that I, OTTO E. RUHOFF, a citizen of the United States, residing at Madison, in the county of Dane and State of Wisconsin, have invented certain new and useful Methods of Making Primary Batteries, of which the following is a specification.

The present invention relates to galvanic cells in which the carbon electrode is surrounded by a depolarizing mixture containing pulverized coke or graphite, as shown in many prior patents in the art. The object of this invention is to provide a change in the depolarizing mixture to greatly improve the strength, efficiency and life of the battery. Broadly speaking, the invention consists in substituting for a part or all of the ordinary carbonaceous material used in the depolarizing mixture so-called deflocculated electrically conductive material, such for example as the well-known Acheson deflocculated graphite, and in the method or process of mixing the ingredients of the depolarizing mixture. The invention consists more in detail in the features more fully hereafter set forth in the specification and claims.

In carrying out this invention, various proportions and materials may be employed, but a most satisfactory result is obtained when the materials used are in about the following proportions:

|  | Parts by weight. |
|---|---|
| Manganese compound | 90 |
| Ordinary battery graphite | 15 |
| Deflocculated conductive material | 3 |
| Sal ammoniac | 12 |

Water sufficient to moisten the ingredients so that they will pack nicely.

The best electrical results are obtained when the deflocculated conductive material constitutes approximately 20% of the carbonaceous material of the battery, and this is also advantageous because it is cheaper than when 100% of deflocculated conductive material is used.

The best results are also obtained when the materials above provided are mixed together by a peculiar method or process. That giving the best results consists in first stirring the deflocculated conductive material in a sufficient amount of water so as to produce a satisfactory suspension of the deflocculated conductive material, and adding to this the dry ordinary battery manganese compound, and agitating the mixture thoroughly. some sal ammoniac or similar salt is then added, and the mixture is again well agitated and is then filtered. The solid material is washed and dried. Before drying or after partially drying, a small quantity of a suitable binding material, such as a gum or sodium silicate may be added, and pressure may be applied to the material if desired. The dried product is ground and the dry battery graphite and more sal ammoniac is added. The resulting product is moistened with water or a suitable electrolyte in sufficient quantity to make it pack, as heretofore described.

Batteries equipped with the foregoing depolarizing agent, particularly when made by the above method, produce most satisfactory results not heretofore obtained.

As is well understood by engineers, deflocculated materials are entirely different from the same materials when reduced to a fine state of division by ordinary processes of comminution, such as any ordinary method of grinding with or without air flotation, even when carried so far as to produce the so-called impalpable material employed in batteries of certain prior patents.

The deflocculated material referred to in the specification and claims is different from any other heretofore used in batteries in the following particulars: In the first place, this deflocculated material can be used only in the form of a dilute solution which is mixed with other battery ingredients, whereas other conductive material, such as carbon, graphite or lamp black are all used in the dry form. In the second place, other forms of conductive material, as covered by various patents usually constitute the whole amount of carbonaceous material that is present in the batteries, and work best when present to the extent of 100% of the conductive material used in the battery. This is not true with the deflocculated materials referred to herein, for, if such deflocculated materials are used alone, without the presence of any other conductive material, a decidedly inferior battery results. The best effect is obtained when the deflocculated material constitutes about 20% by weight of the total conductive material which is used.

This application is a division of my application for primary battery, Serial Number 173,680, filed June 9th, 1917.

Having thus described my invention, what I claim as new and desire to secure by Letters Patent, is:—

1. A method of mixing battery material consisting in first stirring deflocculated conductive material in a sufficient amount of water so as to produce a satisfactory suspension of the deflocculated conductive material, adding to this a manganese compound and agitating the mixture thoroughly, adding some sal ammoniac or similar salt, agitating and filtering the mixture; washing and drying the solid material; adding a small quantity of a suitable binding material, such as a gum or sodium silicate before drying or after partially drying; grinding the dried product and adding more carbonaceous conductive material and sal ammoniac; and finally moistening the resulting product with a liquid in sufficient quantity to make it pack, as described.

2. A method of mixing battery material comprising: stirring deflocculated conductive material in a sufficient amount of water so as to produce a satisfactory suspension of the deflocculated conductive material; adding to this a manganese compound, and agitating the mixture thoroughly; adding sal ammoniac or similar salt and agitating the mixture well, and then filtering and washing the material.

3. A method of mixing battery material comprising: stirring deflocculated conductive material in water in such manner as to produce a satisfactory suspension of the conductive material; adding to this a manganese compound and agitating the mixture thoroughly; adding sal ammoniac or similar salt and agitating the mixture well, and then filtering the mixture; drying and compacting the material; and grinding the product and mixing therewith more carbonaceous conductive material and sal ammoniac.

In witness whereof I have hereunto subscribed my name in the presence of two witnesses.

OTTO E. RUHOFF.

Witnesses:
DWIGHT B. CHEEVER,
M. S. ROSENZWEIG.